US006950440B1

(12) United States Patent
Conway

(10) Patent No.: US 6,950,440 B1
(45) Date of Patent: Sep. 27, 2005

(54) SYSTEM AND METHOD FOR EFFICIENTLY GENERATING PACKETS ON A SERIAL BUS IN RESPONSE TO PARALLEL BUS CYCLES

(75) Inventor: Craig M. Conway, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/271,691

(22) Filed: Mar. 18, 1999

(51) Int. Cl.[7] .............................................. H04L 12/43
(52) U.S. Cl. ..................................... 370/458; 370/466
(58) Field of Search ................................ 370/389, 402, 370/412, 419, 438, 458, 463, 466, 474, 498; 710/100, 101, 104, 105–7, 112–3, 126, 128, 129, 131, 240

(56) References Cited

U.S. PATENT DOCUMENTS

| | | |
|---|---|---|
| 3,946,379 A | 3/1976 | Lippman |
| 4,023,144 A | 5/1977 | Koenig |
| 4,451,886 A | 5/1984 | Guest et al. |
| 4,468,737 A | 8/1984 | Bowen |
| 4,514,823 A | 4/1985 | Mendelson et al. |
| 4,577,317 A | 3/1986 | Chu et al. |
| 4,866,609 A | 9/1989 | Calta et al. |
| 4,959,833 A | 9/1990 | Mercola et al. |
| 5,054,024 A | 10/1991 | Whetsel |
| 5,062,059 A | 10/1991 | Youngblood et al. |
| 5,081,624 A | 1/1992 | Beukema |
| 5,325,491 A | 6/1994 | Fasig |
| 5,371,863 A | 12/1994 | Silver |
| 5,455,911 A | 10/1995 | Johansson |
| 5,572,525 A | 11/1996 | Shen et al. |
| 5,619,659 A | 4/1997 | Kikinis et al. |
| 5,655,112 A | 8/1997 | MacInnis |
| 5,678,057 A | 10/1997 | Rostoker et al. |
| 5,724,529 A | 3/1998 | Smith et al. |
| 5,764,924 A | 6/1998 | Hong |
| 5,781,747 A | 7/1998 | Smith et al. |
| 5,838,393 A | 11/1998 | Simpson et al. |
| 5,838,935 A | 11/1998 | Davis et al. |
| 5,850,571 A | 12/1998 | Odom et al. |
| 5,926,120 A | 7/1999 | Swenson et al. |
| 5,953,511 A | 9/1999 | Sescila, III et al. |
| 6,003,105 A | 12/1999 | Vicard et al. |
| 6,070,214 A | 5/2000 | Ahern |
| 6,076,139 A * | 6/2000 | Welker et al. ............. 711/104 |
| 6,112,311 A | 8/2000 | Beardsley et al. |
| 6,161,157 A * | 12/2000 | Tripathi et al. ............ 710/109 |
| 6,418,504 B2 * | 7/2002 | Conway et al. ............ 710/313 |
| 6,425,033 B1 * | 7/2002 | Conway et al. ............ 710/107 |
| 6,434,649 B1 * | 8/2002 | Baker et al. ............... 710/107 |

* cited by examiner

*Primary Examiner*—David Vincent
(74) *Attorney, Agent, or Firm*—Meyertons Hood Kivlin Kowert & Gestzel, P.C.; Jeffrey C. Hood

(57) ABSTRACT

A Wide Area Serial PCI system for connecting peripheral devices to a computer. The WASP system includes a host computer system connected through a serial bus to a remote device. The serial bus can range from several meters to several kilometers or more. The host computer system includes a CPU and memory, and also includes a first Peripheral Component Interconnect (PCI) bus, also referred to as the local PCI bus. A primary bridge according to the present invention is coupled to the first PCI bus. The primary bridge includes PCI interface circuitry for interfacing to the first PCI bus. The remote device is located remotely from the computer system and comprises a second or remote PCI bus and one or more peripheral devices coupled to the second PCI bus. The remote device also includes a secondary bridge coupled to the second PCI bus.

32 Claims, 10 Drawing Sheets

WASP Block Diagram

PCI-PCI Bridge Block Diagram

Block System Diagram

WASP Block Diagram

*I/O Transaction Forwarding Map*

*Memory Transaction Forwarding Map*

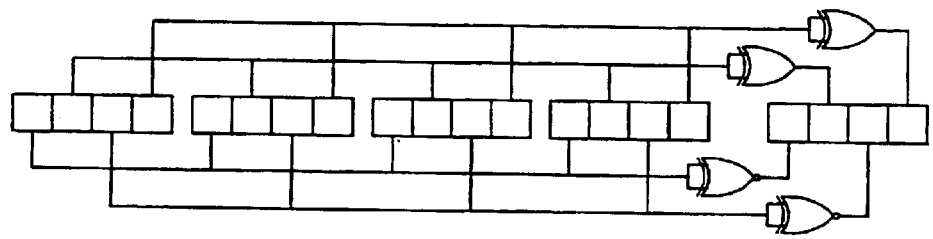

*FIG. 6*
WASP Frame Format and Parity Generation

| Description | | 17 | 16 | 15  12 | 11  8 | 7  4 | 3  0 |
|---|---|---|---|---|---|---|---|
| Posted Write | PW | U | ParErr | 1000 | PCI Cmd | PCI BE | Par |
| PCI Configuration | PCR | U | ParErr | 1001 | PCI Cmd | PCI BE | Par |
| Delayed Request 0 | DR0 | U | ParErr | 1100 | PCI Cmd | PCI BE | Par |
| Delayed Request 1 | DR1 | U | ParErr | 1101 | PCI Cmd | PCI BE | Par |
| Delayed Request 2 | DR2 | U | ParErr | 1110 | PCI Cmd | PCI BE | Par |
| Delayed Completion | DC | U | ParErr | 1111 | PCI Cmd | PCI BE | Par |
| Success Ack | SA | U | U | 0001 | U | U | Par |
| Failure Ack | FA | U | U | 0010 | U | U | Par |
| Sanity Check | SC | U | U | 0011 | U | U | Par |
| Reset | RST | U | U | 0100 | U | U | Par |
| Power On | POP | U | U | 0101 | U | U | Par |

*FIG. 7*
Command Packets

| Error Condition | Response |
|---|---|
| Bad PAR on title frame of command packet | ignore transfer |
| Bad PAR on packet count frame of command packet | submit Failure ACK if received packet is not a Failure ACK or a Sanity Check |
| Bad PAR on data packet | submit Failure ACK |
| Receipt of data packet after fill frame (i.e. command packet did not start transfer) | ignore rest of transfer |
| Received packet count does not match packet counter | submit Failure ACK |

FIG. 8
Error Condition Responses

| Bits 33:32 | Bits 31:0 |
|---|---|
| 00 | Command Frame |
| 01 | PCI Address Frame or Regular Data Frame |
| 10 | PCI Data Frame |
| 11 | Reserved |

FIG. 9
RTQ Packet Encoding

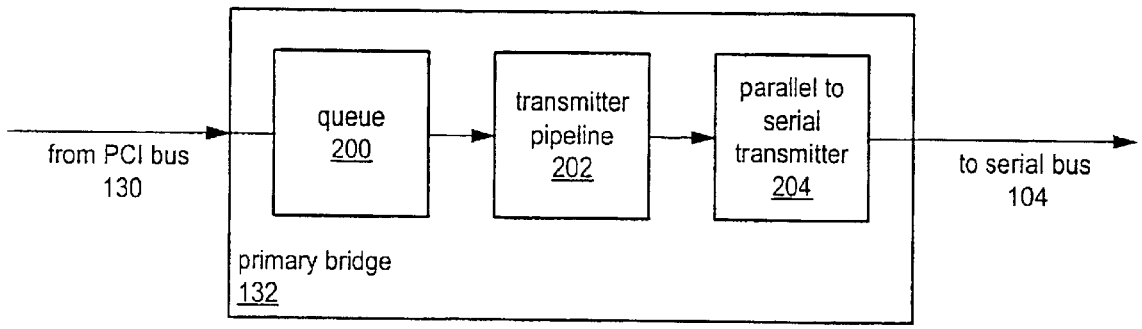

FIG. 10

SYSTEM AND METHOD FOR EFFICIENTLY GENERATING PACKETS ON A SERIAL BUS IN RESPONSE TO PARALLEL BUS CYCLES

FIELD OF THE INVENTION

The present invention relates to computer architecture and, more particularly, to a system and method for efficiently generating packets on a serial bus in response to parallel bus cycles.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include data acquisition devices, oscilloscopes, digital multimeters, pressure sensors, etc. The types of information which might be collected by respective instruments include voltage, resistance, distance, velocity, pressure, frequency of oscillation, humidity or temperature, among others.

Modern instrumentation systems are moving from dedicated stand-alone hardware instruments such as oscilloscopes, digital multimeters, etc., to a concept referred to as virtual instrumentation. Virtual instrumentation systems include instrumentation hardware, such as circuit boards which plug into general purpose personal computers, or external devices which couple to the computer, such as through a serial link or parallel bus. The instrumentation hardware is controlled by software which executes on the computers. Many virtual instrument hardware devices have been developed which plug into the computer's expansion bus, e.g., the PCI bus. Other types of instrumentation buses are external to the computer, such as the VXI (VMEbus eXtensions for Instrumentation) bus, the General Purpose Interface Bus (GPIB), and the PXI (PCI eXtensions for Instrumentation) among others.

In instrumentation applications, as well as others, often the instrument or I/O function is physically located remotely from the host computer. For example, as noted above, in VXI and PXI systems, the instrument comprises a card which is comprised in a VXI or PXI chassis, respectively, which is separate from the computer. In a similar manner, GPIB instruments are external instruments which are coupled to the computer through the GPIB bus and a GPIB interface card comprised in the computer. Data acquisition (DAQ) devices are also many times external to the computer, such as when the computer includes no expansion slots or no available expansion slots. Other instances when a DAQ device or instrument is external to the computer occur when the instrument or DAQ device may be required to be located in a location or test chamber which is separated by some distance from the host computer controlling it.

One solution for remotely interfacing VXI instruments in a VXI chassis to a computer is the Multisystem eXtension Interface (MXI) bus. Other solutions for remotely interfacing devices to a computer include serial buses, such as the universal serial bus (USB) or the IEEE 1394 serial bus. These serial buses interface to the computer, such as through the computer's parallel expansion bus, e.g., the PCI bus, or through the computer's chipset logic.

The Peripheral Component Interconnect (PCI) Local Bus is a high performance, 32-bit or 64-bit bus with multiplexed address and data lines. It is intended for use as an interconnect mechanism between highly integrated peripheral controller components, peripheral add-in boards, and processor/memory systems. The PCI bus has emerged as a very popular expansion bus for many computer systems and embedded systems. A plethora of chipsets, devices, and controllers with a PCI bus interface have been marketed in the last few years. Examples of I/O functions performed by PCI products include high-speed graphics controllers, Small Computer System Interface (SCSI) controllers, Fiber Channel adapters, Serial Storage Architecture (SSA) adapters, and local area network (LAN) interface devices such as Ethernet, Token Ring and FDDI controllers.

Thus, the computer's parallel expansion bus, e.g., the PCI bus, interfaces through a serial communication line to an external device. The external device may include the same or similar parallel bus for ease of development. For example, methods currently used in the industry to connect external devices include PCI, CompactPCI, and PXI. CompactPCI is an adaptation of the PCI mechanical form factor for industrial and/or embedded applications requiring a more robust mechanical form factor than Desktop PCI. CompactPCI is electrically compatible with the PCI specification and provides an optimized system for rugged applications. PXI (PCI eXtensions for Instrumentation) is an instrumentation standard based on the CompactPCI form factor and based on the PCI electrical specification, with extensions for instrumentation.

It would be desirable for external devices to appear to the computer system as if they were coupled directly to the local expansion bus in the computer system. It would also be desirable to obtain efficient communication between external devices and the computer system. It would further be desirable to provide a more efficient mechanism for converting parallel bus cycles into serial packets.

SUMMARY OF THE INVENTION

The present invention comprises a system and method for efficiently generating packets on a serial bus in response to parallel bus cycles. The system comprises a host computer system that includes a CPU and memory and a first parallel bus, e.g. a first Peripheral Component Interconnect (PCI) bus. A primary bridge according to the present invention is coupled to the first PCI bus. The primary bridge includes PCI interface circuitry for interfacing to the first PCI bus. A remote or external device is located remotely from the computer system, wherein the remote device comprises a second or remote parallel bus, preferably a PCI bus, and one or more peripheral devices coupled to the second PCI bus. A secondary bridge is coupled to the second PCI bus, wherein the secondary bridge includes PCI interface circuitry for interfacing to the second PCI bus. A serial bus is coupled between the primary bridge and the secondary bridge.

The primary bridge and secondary bridge are operable to transmit PCI bus cycles over the serial bus. The primary bridge is operable to receive PCI cycles on the first PCI bus and generate serial data on the serial bus in response thereto, and the secondary bridge is operable to receive the serial data from the serial bus and generate corresponding PCI cycles on the second PCI bus. In a similar manner, the secondary bridge is operable to receive PCI cycles on the second PCI bus and generate serial data on the serial bus in response thereto, and the primary bridge is operable to receive the serial data from the serial bus and generate corresponding PCI cycles on the first PCI bus. In this manner, the CPU in the host computer system is operable to generate cycles on the first PCI bus to communicate with peripheral devices coupled to the second PCI bus. Likewise, the peripheral devices in the remote device coupled to the second or remote PCI bus can generate cycles on the second PCI bus to communicate with the CPU, memory or other devices in the computer system.

Each of the primary bridge and secondary bridge include parallel to serial transceivers for converting parallel data generated on the first PCI bus and second PCI bus, respectively, to serial data for transmission on the serial bus and for converting serial data received from the serial bus to parallel data for generation on the first PCI bus and second PCI bus, respectively. The primary bridge and the secondary bridge preferably collectively implement a PCI—PCI bridge register set.

A PCI bus cycle includes an address phase and one or more data phases. The address phase further includes a command value and an address value, and each data phase further includes a set of byte enable values and a data value. The PCI bus cycle can be received by either a primary or secondary bridge. When the primary or secondary bridge accepts a PCI bus cycle, it stores the information contained in the address phase and in each data phase into a queue. The bridge then generates a series of packets that correspond to the stored PCI bus cycle when the address phase of the PCI bus cycle reaches the head of the queue. The series of packets includes a command packet and a plurality of data packets. The bridge then transmits the series of packets over the serial bus to the other respective bridge.

The bridge first generates a command packet as part of the series of packets. A command packet includes a set of predicted byte enable values. The set of actual byte enable values is not known until the data phase reaches the head of the queue. When the data phase reaches the head of the queue, the set of actual byte enable values is compared with the set of predicted byte enable values included in the command packet. If the set of actual byte enable values matches the set of predicted byte enable values, then the primary bridge continues to generate packets for the address value and the data value or values. If the set of actual byte enable values differs from the set of predicted byte enable values, then the primary bridge generates another command packet that includes the set of actual byte enable values and discards the earlier command packet. Thus, if the predicted byte enable values match the actual byte enable values, then the bridge generates packets with increased efficiency. If the predicted byte enable values are later determined to be incorrect when the actual byte enable values arrive at the head of the queue, then the bridge generates a second command packet at that time, which is when the bridge would otherwise be required to generate the command packet. Thus, the present invention provides improved performance for a large number of cycles.

BRIEF DESCRIPTION OF THE DRAWINGS

A better understanding of the present invention can be obtained when the following detailed description of the preferred embodiment is considered in conjunction with the following drawings, in which:

FIG. 6: illustrates the WASP Frame Format and Parity Generation;

FIG. 7: illustrates WASP Command Packets;

FIG. 8: is a table describing the Error Condition Responses;

FIG. 9: is a table describing the RTQ Packet Encoding;

FIG. 10: is a block diagram of one embodiment of a portion of a primary bridge.

Figure 1:
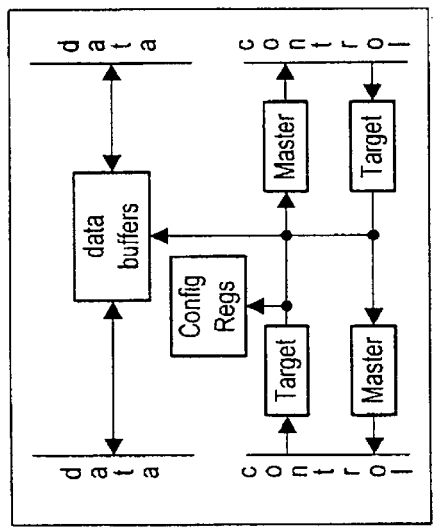
FIG. 1: shows a PCI—PCI Bridge Block Diagram according to the prior art.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference:

The following materials are hereby incorporated by reference as though fully and completely set forth herein:

U.S. application Ser. No. 09/092,342 titled "Wide Area Serial PCI System and Method for Interconnecting Multiple PCI Buses" and filed Jun. 5, 1998, whose inventors are Craig M. Conway, Kevin L. Schultz, B. Keith Odom, Glen O. Sescila, Bob Mitchell, Ross Sabolcik, and Robert Hormuth, and U.S. Provisional application Ser. No. 60/052,123 titled "Wide Area Serial PCI" and filed Jul. 10, 1997, whose inventors are Craig Conway, B. Keith Odom, Glen Sescila, Robert Hormuth, and Kevin Schultz;

U.S. Provisional application Ser. No. 60/050,399 titled "Wide Area Serial PCI" and filed Jun. 20, 1997, whose inventor is Craig Conway;

*PCI Local Bus Specification*, Revision 2.1, available from Intel Corporation;

*DIGITAL Semiconductor 21152 PCI-to-PCI Bridge* (Order Number EC-QUW9D-TE), available from Digital Semiconductor;

*PCI to PCI Bridge Architecture Specification*, Revision 1.0, available from Intel Corporation;

*CompactPCI Specification*, Revision 2.1, available from PICMG;

*CompactPCI Specification Short Form*, Revision 2.1 (available from www.picmg.org), available from PICMG;

*PXI Specification*, Revision 1.0, available from National Instruments Corporation.

Parallel to Serial Conversion System and Method of the Present Invention

The present invention comprises a system and method for efficiently generating packets on a serial bus in response to parallel bus cycles. It is noted that the present invention may be implemented on any parallel bus that transmits information in multiple phases. In the following description, the present invention is described with reference to the Peripheral Component Interconnect (PCI) bus. The implementation of the present invention using other parallel bus architectures is contemplated.

Introduction to WASP

The WASP (Wide Area Serial PCI) is a PCI master/slave device implementing the PCI—PCI bridge register set. The WASP couples two physically separate PCI buses via a copper or fiber optic serial link. By using the PCI—PCI bridge register set, the WASP is automatically recognized by the system BIOS of a PC and will enable that BIOS to configure and provide information on devices on the remote PCI bus. This ensures that the software written for a PCI device will function the same whether that device exists inside the PC or is coupled to the PCI via the WASP serial PCI link.

The WASP of the present invention operates to provide a transparent link between two PCI buses. The WASP, for example, can replace MXI-2 in systems that connect a PC to a VXIbus or VMEbus backplane. The WASP or WASP system functions as a PCI to PCI bridge, connecting separate PCI buses. The WASP chipset implements a serial protocol, preferably the SerialPCI protocol, to provide a transparent serial link between two PCI buses.

Theory of Operation

FIG. 1 is a prior art diagram which illustrates the basic block diagram of a PCI—PCI bridge. The PCI—PCI bridge couples two PCI buses transparently; however, the bridge must reside on the same printed circuit card as the secondary PCIbus it bridges. By maintaining the PCI—PCI bridge paradigm but splitting the bridge into two halves connected by a serial link, the WASP of the present invention can couple completely separate PCI buses, on the order of a few meters apart to a few kilometers apart.

Figure 1A:
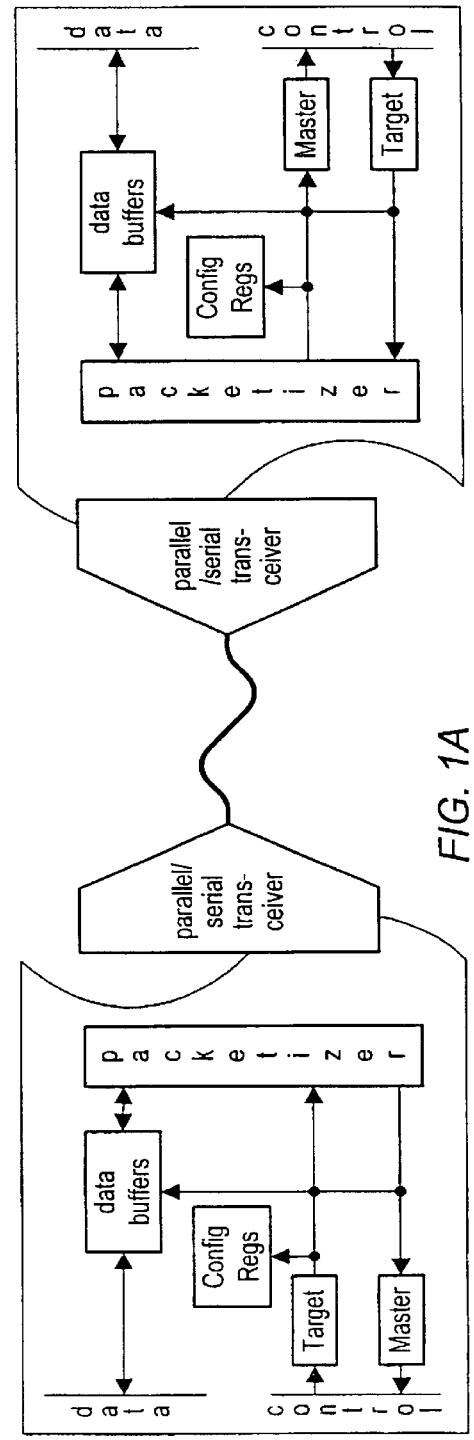
FIG. 1a: shows a WASP System Block Diagram according to the present invention, including a primary WASP bridge and a secondary WASP bridge.

FIG. 1A illustrates the WASP of the present invention. As shown, by maintaining the PCI—PCI bridge paradigm but splitting the bridge into two halves connected by a serial link, the WASP of the present invention can couple completely separate PCI buses, on the order of a few meters apart to a few kilometers apart.

The left half of the system shown above corresponds to the upstream, or primary, PCI interface. The primary PCI interface contains the Type 1 Configuration register set as required for PCI—PCI bridges. Upon recognizing this interface, the PC BIOS can enumerate and configure PCI devices on the secondary PCI bus which is controlled by the right half of the system shown in FIG. 1A. This half is the downstream, or secondary, interface. Note that while both the primary and secondary interfaces have configuration registers, they are preferably only accessible via accesses on the primary PCI bus. The registers of the secondary interface are only accessible via the serial link. The secondary PCI interface does not respond to PCI cycles except to pass them upstream.

A full Serial PCI solution requires two WASPs with a copper or fiber serial link between them. The WASP has two modes: Primary and Secondary. The name of each mode corresponds to the hierarchy of PCI buses to which the respective WASPs connect.

Figure 2:
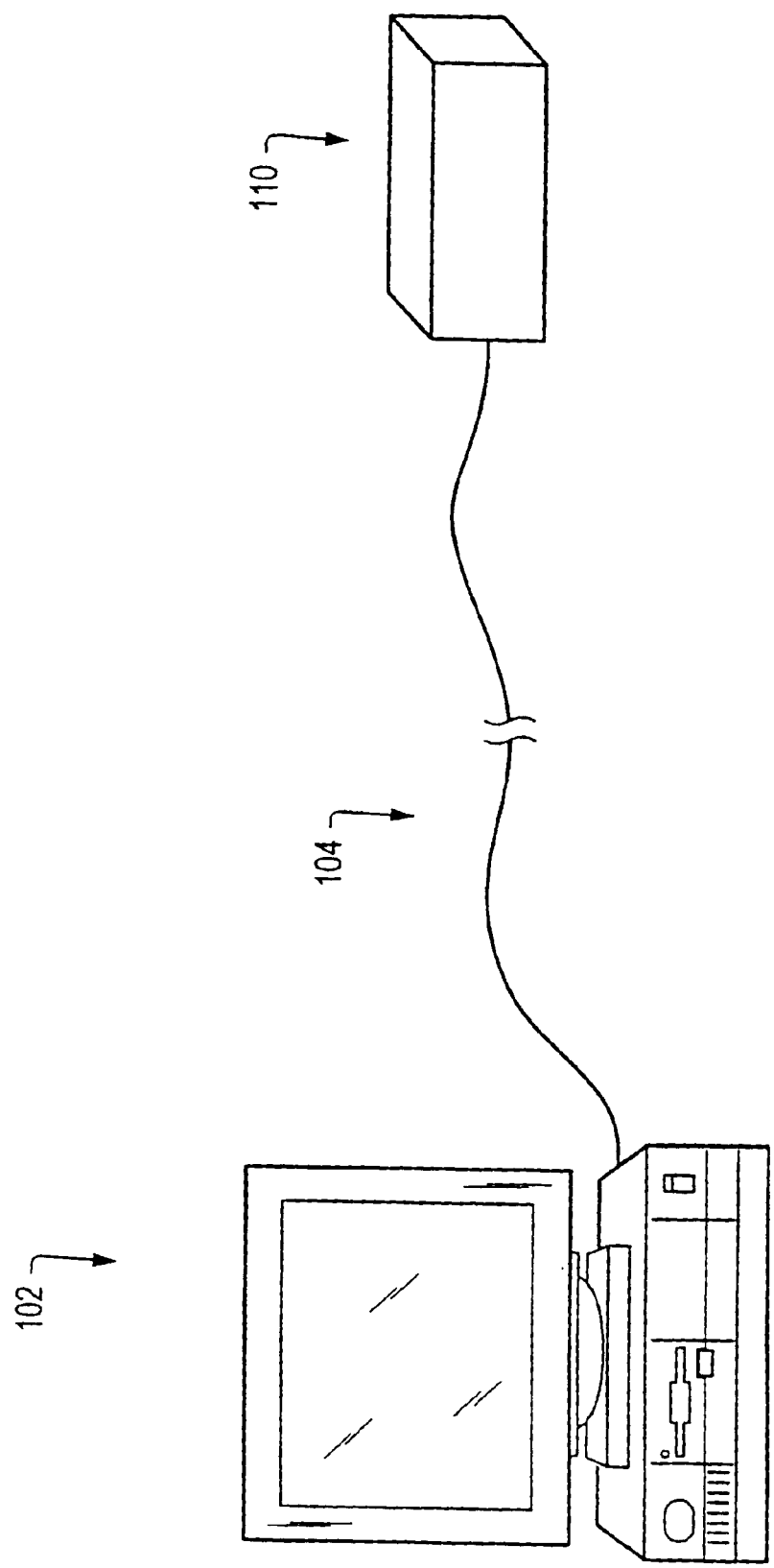
FIG. 2: shows a block diagram of a system utilizing the WASP of the present invention.

FIG. 2 illustrates a WASP system according to one embodiment of the present invention. As shown, the present invention comprises a Wide Area Serial PCI system for connecting peripheral devices to a computer. The WASP system includes a host computer system 102 connected through a serial bus 104 to a remote device 110. The serial bus 104 can range from several meters to several kilometers or more. The serial bus 104 may be any of various types of physical connections, such as copper wire, coaxial cable, or fiber optic cable, among others. The serial bus 104 may also implement various types of protocols, such as IEEE 1394 or IEEE 1394.2, among others.

Figure 2A:
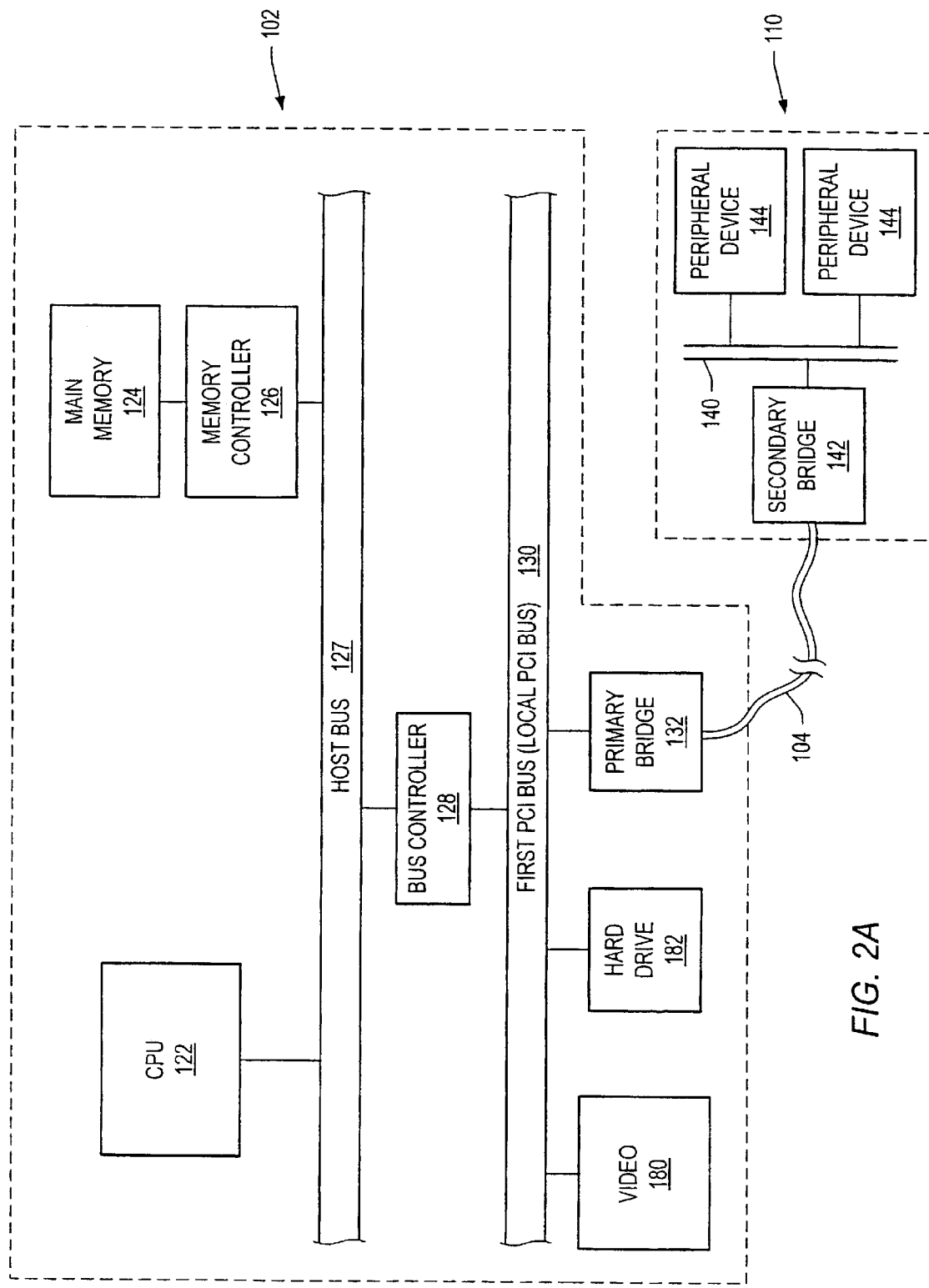
FIG. 2a: is a block diagram of the system of FIG. 2.

As shown in FIG. 2A, the host computer system 102 includes a CPU 122 and memory 124, and also includes a first Peripheral Component Interconnect (PCI) bus 130. It is noted that the computer system 102 may have any of various system architectures. As shown in FIG. 2A, the CPU 122 couples to a host bus 127. The memory 124 couples through a memory controller 126 to the host bus 127. The computer includes chipset logic which implements a PCI bridge or bus controller 128. The bus controller couples to a first PCI bus 130, also referred to as the local PCI bus 130. Various devices may be connected to the PCI bus 130, such as a video or graphics card 180, a hard drive 182, or instrumentation devices. A primary bridge 132 according to the present invention is coupled to the first PCI bus 130. The primary bridge 132 includes PCI interface circuitry for interfacing to the first PCI bus 130.

The remote device 110 is located remotely from the computer system 102. The remote device 110 comprises a second or remote PCI bus 140 and one or more peripheral devices 144 coupled to the second PCI bus 140. The remote device 110 also includes a secondary bridge 142 coupled to the second PCI bus 140. The secondary bridge 142 includes PCI interface circuitry for interfacing to the second PCI bus 140. The serial bus 104 is coupled between the primary bridge 132 and the secondary bridge 142.

Each of the primary bridge 132 and secondary bridge 142 include parallel/serial transceivers for converting parallel data generated on the first PCI bus 130 and second PCI bus 140, respectively, to serial data for transmission on the serial bus 104 and for converting serial data received from the serial bus 104 to parallel data for generation on the first PCI bus 130 and second PCI bus 140, respectively. The primary bridge 132 and the secondary bridge 142 collectively implement a PCI—PCI bridge register set.

The primary bridge 132 and secondary bridge 142 are operable to transmit PCI bus cycles over the serial bus 104. The primary bridge 132 is operable to receive PCI cycles on the first PCI bus 130 and generate serial data on the serial bus 104 in response thereto, and the secondary bridge 142 is operable to receive the serial data from the serial bus 104 and generate corresponding PCI cycles on the second PCI bus 140. In a similar manner the secondary bridge 142 is operable to receive PCI cycles on the second PCI bus 140 and generate serial data on the serial bus 104 in response thereto, and the primary bridge 132 is operable to receive the serial data from the serial bus 104 and generate corresponding PCI cycles on the first PCI bus 130. In this manner, the CPU 122 in the host computer system 102 is operable to generate cycles on the first PCI bus 130 to communicate with peripheral devices coupled to the second PCI bus 140. Likewise, the peripheral devices in the remote device 110 coupled to the second or remote PCI bus 140 can generate cycles on the second PCI bus 140 to communicate with the CPU 122, memory 124 or other devices in the computer system 102.

Thus, according to the present invention, the CPU 122 is operable to generate cycles on the first PCI bus 130 to communicate with a peripheral device, wherein the peripheral device is coupled to either the first PCI bus 130 or the second PCI bus 140. In addition, software developed to communicate with a peripheral device coupled to the first PCI bus 130 of the host computer can also be used to communicate with the peripheral device regardless of whether the peripheral device is coupled to the first PCI bus 130 or the second PCI bus 140. Thus, to the CPU, the one or more peripheral devices coupled to the second PCI bus 140 appear coupled to the first PCI bus 130. Stated another way, the one or more peripheral devices coupled to the second PCI bus 140 are virtually coupled to said first PCI bus 130.

Each of the PCI buses or interfaces 130 and 140 preferably conforms to the Peripheral Component Interconnect Revision 2.1 Specification, which is hereby incorporated by reference in its entirety as though fully set forth herein. PCI specification states, "the PCI Local Bus is a high performance, 32-bit or 64-bit bus with multiplexed address and data lines. The PCI bus is intended for use as an interconnect mechanism between highly integrated peripheral controller components, peripheral add-in boards, and processor/memory systems." PCI bus operations are well known to those of ordinary skill in the art. However, basic PCI read and write cycles, or transactions, will be described here briefly for clarity. It is noted that the present invention may be used with future revisions of the PCI bus standard and/or other expansion bus standards, as desired. As used herein, the term "PCI bus" is intended to include the current PCI bus implementation, as well as future PCI bus implementations or revisions.

PCI bus read and write transactions occur between an initiator device, also referred to as a master, and a target device, also referred to as a slave. PCI bus read and write transactions include an address phase and one or more data phases. During the address phase, a valid address is supplied on the PCI bus address/data signals by the initiator of the transaction. The address specifies the source address of read transaction data or the destination address of write transaction data. During a data phase, the data to be read or written is transferred on the PCI bus address/data signals.

The initiator indicates the presence of valid data during a write transaction, or the reception of the data on a read transaction, via the IRDY# (initiator ready) signal. The target indicates the presence of valid data during a read transaction, or the reception of the data on a write transaction, via the TRDY# (target ready) signal. A data phase may comprise data transfer and wait state cycles. If a master or target is not ready to receive or supply data on a given bus clock cycle during data phase, it may insert wait states by deasserting the IRDY# or TRDY# signal, respectively.

The PCI specification also provides a means for a target to prematurely terminate a bus transaction by performing a target initiated termination, or disconnect. One of the prescribed target initiated termination means is referred to as a "retry" since it instructs the master to retry the bus transaction again.

Block Diagram

Figure 3:
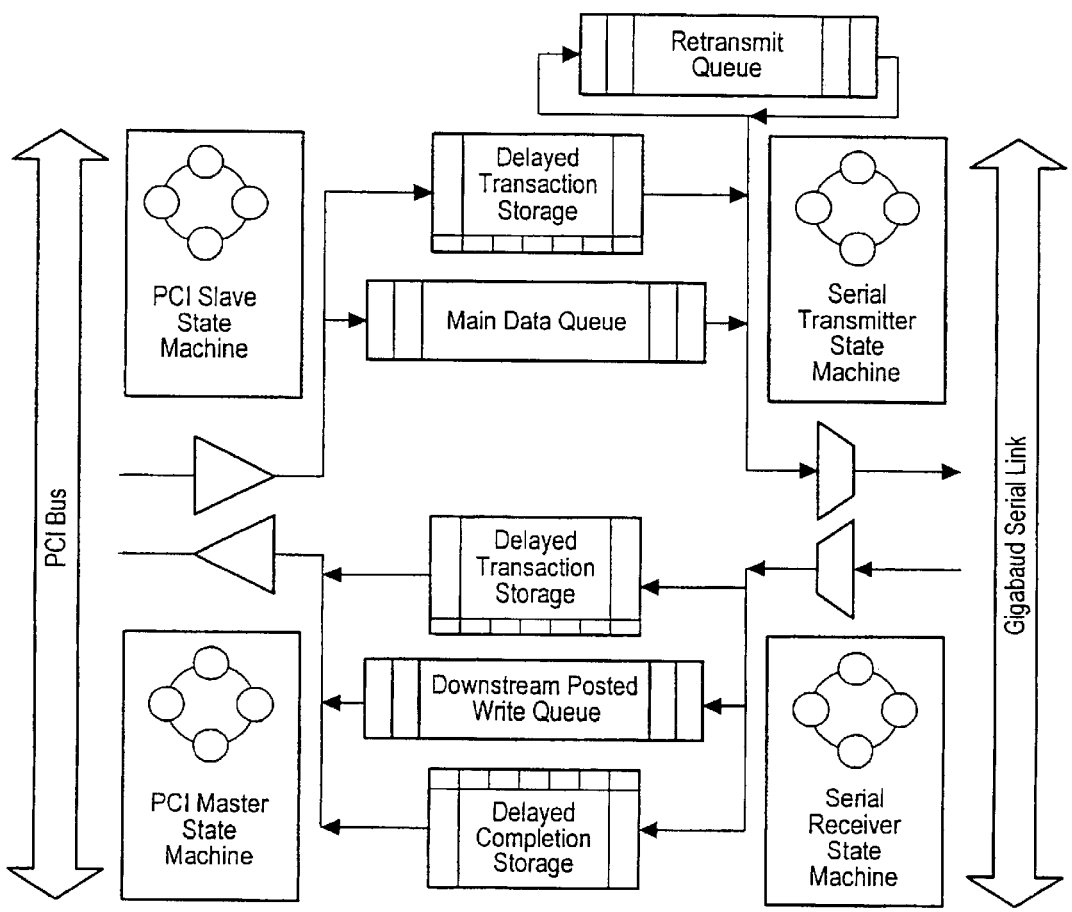
FIG. 3: shows a Block Diagram of a WASP bridge.

FIG. 3 is a block diagram that illustrates the internal architecture of the WASP, i.e., of each of the WASP bridges 132 and 142. In the present disclosure, the term "WASP" is used to refer to a WASP bridge, such as bridges 132 and 142. Shown in the diagram are four state machines, six transaction queues, and the interfaces to the PCI bus and to the parallel interface. The four state machines include a PCI Slave State Machine, a PCI Master State Machine, a Serial Transmitter State Machine, and a Serial Receiver State Machine. The transaction queues include a retransmit queue, a delayed transaction storage queue, a data queue used on the PCI to serial portion, and a data queue used on the serial to PCI portion.

System Operation

This portion of the application describes the operation of a WASP system, including the power on procedure, configuration, and general operation.

Modes

WASP operation requires two separate modes, primary and secondary. These two modes are determined by the state of the PRIMARY pin. When PRIMARY is high, the WASP is in primary mode and is placed upstream (closest to the host processor) in the PCIbus hierarchy. When PRIMARY is low, the WASP is in secondary mode and is placed downstream (farthest from the host processor). In this mode, it is also often the PCI system controller, providing clock and arbitration functions.

System Startup

After its power on reset input becomes high (deasserted), the WASP begins the issuing a sequence of packets called POP (Power On Packets) packets. These packets allow the two WASPs to synchronize the operation of their transmit and receive ports.

The secondary WASP generates POPA (Power On Packet Acknowledge) packets in response to the receipt of POP packets. The secondary WASP will continue to send POPA packets until it receives a packet other than POP or POPA. This should happen fairly soon after power on as the BIOS begins to configure the PCI interface presented by the primary WASP.

When the primary WASP receives the POPA packet, it asserts its internal BNO (begin normal operation) signal and allows its PCI port to begin accepting PCI cycles. Until BNO asserts, all PCI cycles decoded by the WASP will be retried.

This startup sequence provides two benefits to the WASP system. First, it allows the two sides of the WASP system to be powered up in any order. Second, it is also used to resynchronize the two WASPs in the event that power is lost and restored on either WASP.

Note that neither of these scenarios is foolproof. First, if the host processor is powered up long before the secondary WASP system and has a limit on the number of retries it will perform, the BIOS may determine that the primary WASP is a nonresponsive device because it has requested more retries than the host system will deliver. Second, if power is lost and restored on the secondary WASP, there are many configuration issues that will need to be resolved regarding the devices residing downstream of the WASP link.

Configuration

Once PCI reset deasserts (becomes high), the host PC is free to begin configuring PCI devices. When it encounters the WASP, it will attempt to configure the WASP and any devices residing on PCI buses behind it. If the serial link is not operational, the primary WASP will reject all PCI cycles with a retry and will start a 16 second timer. Once that timer expires, the WASP's PCI port will only accept Type 0 configuration cycles. It will reject all other PCI cycles with a master abort. If the serial link becomes operational, it will begin the POP sequence and again allow PCI cycles of any type to occur.

The preferred power on sequence for the WASP system is to turn on devices farthest from the CPU first, and the CPU last. If this is done, all WASP serial links will be synchronized. If, for some reason, a user must provide power to a secondary device after providing power to the CPU, the timer gives that use 16 seconds to do so.

Transmission Count

Both the primary and the secondary WASPs maintain a count of the frames transmitted and received. All frames except those that are part of a Failure Acknowledge or Sanity Check generate a strobe that increments the transmission count.

This transmission count can then be used to detect if a frame was dropped and can also be used to instruct the initiator of the transfer that it must retransmit its information starting at a certain point.

WASP—WASP Communication

In many cases, the communication between the two WASPs does not involve the transfer of PCI data from one PCI bus to the other. These cases are discussed below.

Interrupts, SERR*, and PERR*

The secondary WASP monitors all four PCI interrupt lines, PERR*, and SERR*. When it detects a change in any of these lines, it creates a Type 0 Configuration cycle on the serial bus writing to the Interrupt Control Register or the Asynchronous Signal Register. After the primary WASP accepts this signal, it writes the data to the appropriate register. Depending on the status of enable bits in other registers, the primary WASP may assert the interrupts or other signals.

Transfer Acknowledgment and Sanity Checks

The WASPs must let each other know that transfers have been received successfully or must be retransmitted. Specific transfer types have been described specifically for this type of communication. They are described in the next section.

FIGS. 4–6

Figure 4:
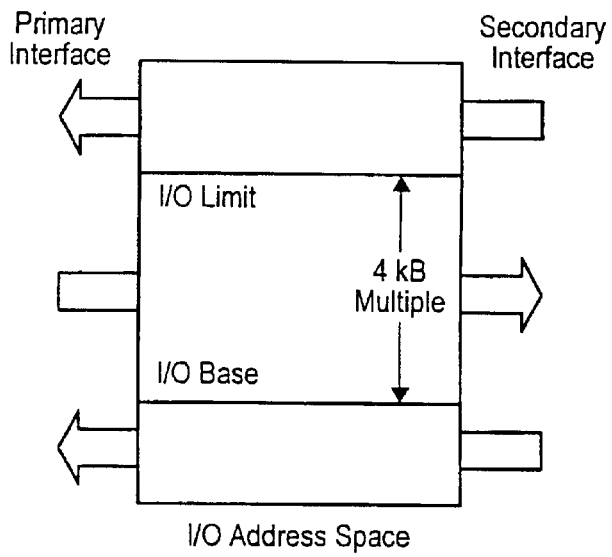
FIG. 4: illustrates the input/output Transaction Forwarding Map.
Figure 5:
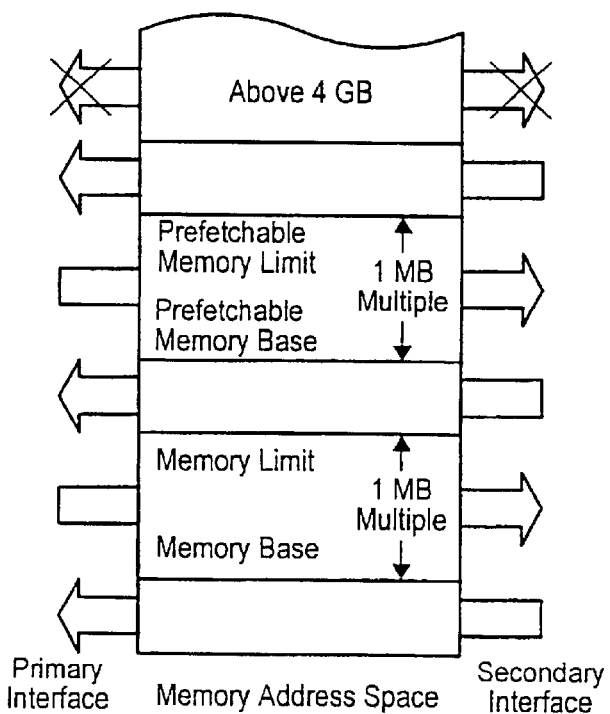
FIG. 5: illustrates the memory Transaction Forwarding Map.

FIG. 4 illustrates the input/output Transaction Forwarding Map for the WASP, FIG. 5 illustrates the memory Transaction Forwarding Map for the WASP, and FIG. 6 illustrates the WASP Frame Format and Parity Generation.

Serial Bus Operation

The WASP can use various transmission protocols, including IEEE 1394, IEEE 1394.2, or other standard or proprietary protocols. In the preferred embodiment, the WASP system transfers information between two PCI buses using a high speed full duplex serial link as the transmission medium. Although this serial link increases the latency of the first piece of information transferred, the aggregate bit rate is fast enough to maintain sustained performance close to that achieved by the PCI bus.

The primary goal of the WASP serial protocol is achieving a high throughput. Second to this goal is limiting the first cycle latency of the link. Unfortunately, these two goals often conflict. A larger serial packet size usually increases overall throughput but also increases latency. The WASP protocol was designed to allow for high bandwidth transfers while limiting the first cycle latency. It does this with an efficient packet management scheme.

The Serial Packet

A WASP serial transfer is a multi-byte entity consisting of at least three 40-bit packets. Each 40-bit packet is transmitted or received by the WASP as two 20-bit frames. These frames each contain 16 bits of information about the transaction (command, address, or data) and 4 bits of parity.

The WASP uses the FLAG signal to differentiate between the upper and lower half-frames FIG. 6 illustrates the frame format and how the 4-bit parity field is generated.

Notice that two of the parity bits implement even parity while the other two implement odd parity. This prevents a long string of erroneous ones or zeroes from passing undetected through the parity check circuitry because it guarantees that every frame must have at least 2 ones and at least 2 zeroes.

A transfer comprises multiple packets that correspond to the individual elements of a PCI transaction. For example, a single DWORD PCI write appears on the serial bus as six frames (three packets), two for the command phase, two for the address, and two for the data. These six frames together comprise the transfer. A WASP transfer is analogous to the packet of most existing serial protocols.

This scheme allows a receiver to verify the integrity of a packet as each frame comes through the serial link instead of storing the entire packet and then determining if it was successfully received. The protocol makes no restrictions on the number of packets that can be concatenated. This means that large amounts of data can be transferred one-per-clock while small amounts of data do not waste bandwidth by requiring the creation of a larger packet to house them.

WASP Serial Protocol

The GLink transceivers inherently recognize three packet types: command, data, and fill. A command frame tells the receiver what type of information is contained in the following frames. Data frames usually PCI address and data information. Fill frames are inserted by the GLink transmitter when no Command or Data frames are being sent to ensure that the receiver is able to maintain a phase lock on the incoming serial stream.

Command Codes

Although the parallel interface of the GLink chips is 20 bits wide, the command half-frame only contains 18 bits of transmittable information (a limitation of the GLink chip). The WASP protocol requires that the four lower bits be used as the parity check; therefore, 14 bits are used to describe the impending transfer.

The table in FIG. 7 describes the various command frames that can be sent and received by the WASP.

Note that each frame contains command-specific information and information about the transmission count. The WASP uses the transmission count to ensure that each packet may be uniquely identified in case an error occurs. If an error occurs, the transmitter can be notified and will begin to retransmit the information beginning at the packet number (or transmission count) that had the error. The following sections will describe the various scenarios.

Posted Write Transactions

The transmitter uses code 1000 to indicate that the current transfer (which begins with a command frame) is a posted write. The PCI command will always indicate that the cycle is a memory write (MWI is converted to MW by the WASP).

PCI Configuration Transactions

The transmitter uses code 1001 to indicate that the current transfer is a PCI configuration write accepted by the primary WASP. The primary WASP passes all write accesses to its configuration registers to the secondary WASP so that the two WASPs have identical copies of the register values.

The WASP does not mirror every bit of every register. The register descriptions list which bits are accepted and changed when a serial Type 0 Configuration transfer is received.

Because the WASPs automatically update each other's registers, it is not necessary to transmit Type 0 configuration reads over the serial link. All reads of the WASP occur on the primary bus and are serviced by the primary WASP.

Delayed Request Transactions

The transmitter uses codes 1100, 1101, 1110 to indicate that the current packet is a delayed request transaction that must be completed on the other PCI bus. Status from that cycle must then be returned via a delayed completion transaction (code 1111). The three codes correspond to the three delayed transaction channels of the WASP.

Delayed Completion Transactions

The transmitter uses code 1111 to indicate that the current packet is a delayed completion. A delayed completion returns data and/or status for a PCI cycle back to the PCI bus originating the transaction.

The status of a delayed completion is returned in the first data frame of the packet. The remaining data frames contain PCI data. In addition to status, the first data frame also describes which delayed transaction channel is being serviced. Bits 2–0 indicate which channel is being serviced. Bit 3 is set if the transaction was successful. Bit 4 is set if the transaction received a master abort. Bit 5 is set if the transaction received a target abort.

Although parity errors can also occur, they are passed back in the ParErr bit of the command frame.

When the WASP receives a delayed completion packet with the target abort bit set, it returns a target abort when the PCI master retries the cycle. If the WASP receives a delayed completion packet with the master abort bit set, it will either return 0xffff_ffff or target abort, depending on the state of the Master Abort Mode bit in the Bridge Control Register.

Success Acknowledge Transactions

The transmitter uses code 0001 to indicate that the current transfer is a success acknowledge packet.

The ACK packet actually has two purposes. It tells the transmitter about the status of the receiver's Downstream Queue (the queue of posted writes and delayed transactions waiting for the master state machine to issue them to the PCI bus). It also tells the transmitter what the latest frame count is, allowing the transmitter to flush its retransmit queue up to that point.

Failure Acknowledge Transactions

The transmitter uses code 0010 to indicate that the current transfer is a Failure Acknowledge.

The Failure Acknowledge is essentially a retransmit request. It is similar to the Success Acknowledge transfer.

On receipt of a Failure Acknowledge transfer, the WASP stops transmitting as soon as possible and flush its retransmit queue until its own transmission counter equals the retransmission point. The transmitter then begins to retransmit the information from there.

Table 8 describes the error conditions that can occur and whether or not WASP will return a Failure Acknowledge.

Although more error conditions exist than are listed in the table, all error conditions break down into one of the categories listed. For example, the table does not specifically list the assertion of the ERROR signal from the GLink chips; however, because the WASP ignores the current packet when this occurs, the problem would manifest itself as either the receipt of a data packet after a fill frame or as a non matching packet count.

Reset Transactions

The transmitter uses code 0100 to indicate that the current transfer is a reset. This transfer is generated when the PCI reset line asserts and deasserts. Bit 0 of the first data frame indicates whether this is a reset assertion or a reset deassertion.

Because PCI reset is received by the primary WASP and is generated by the secondary WASP, the Reset Transaction is only sent from primary to secondary.

Additionally, at power-up, the primary WASP does not send a packet instructing the secondary WASP to assert PCI reset. The secondary WASP automatically drives PCI reset while Power-On reset is asserted.

Sanity Check Transactions

The transmitter uses code 0011 to indicate that the current transfer is a sanity check.

The sanity check is a method of providing an overall error checking umbrella that can catch the error patterns that the 4 bit parity might miss. The Sanity CRC is a running CRC calculated on the information sent across the serial link, instead of being an autonomous CRC that is only calculated on a single frame. When the receiver gets a sanity check packet, it verifies that the Sanity CRC matches its own Sanity CRC. If it does, operation continues as normal. If it does not, then both the primary and secondary WASPs assert SERR_n and system operation halts.

Error Detection and Correction

The WASP maintains several methods of error detection and provides a means to correct most errors when they are detected. When the receiving WASP detects an error, it issues a Failure Acknowledge back to the transmitting WASP. If the error occurred in the middle of the payload of a large packet, the receiving WASP will have already accepted the first part of the packet and, in fact, the PCI master state machine may have already begun consuming it. A Failure Acknowledge, therefore, is a request to start a new transfer beginning at the point where the error occurred. The transmitting WASP must issue a new command packet (with the packet count expected by the receiving WASP), a new data packet with the updated PCI address, and data packets beginning with the one causing the error.

On detecting the error and submitting a retransmission request, the receiving WASP will no longer accept packets until it receives a command packet with the same transmit count as requested by the Failure ACK.

The error detection methods are described in the following subsections.

Parity

A 4 bit parity word is generated for each frame-frame. Each of the 4 bits corresponds to one bit of each nibble of the other 16 bits of the half-frame. When a receiver detects a parity error, it discards that packet and sends a message back to have the source retransmit the information beginning at the invalid frame. The 4 bit parity field in each half-frame is designed to detect all of the expected error modes of a serial system; however, like all CRC and parity check mechanisms, it can not detect 100% of all errors.

Packet count

By keeping a running tally of the number of frames sent, the WASP can detect if a frame was dropped. The start of every transfer begins with a command frame that includes the frame's count. If the receiver's frame count does not match that received, it can ask for a retransmission beginning at the missing frame.

Packet Monitoring

The WASP expects every packet to begin with a command frame and to complete the entire transfer on consecutive clocks. If a fill frame ever directly precedes a data frame, then either a command frame was dropped or one of the data frame in the middle of a transfer was dropped. The WASP cannot distinguish between the two.

In this situation, the WASP does not request retransmission. The WASP cannot tell what type of transfer is occurring based on a missing or corrupted command packet. Because it would be undesirable for the WASP to transmit a Failure Acknowledge based on a bad Failure Acknowledge, the WASP cannot ask for retransmission until it receives the next command frame.

The WASP simply discards the remaining data frames without incrementing its frame counter. When the next valid command packet appears at the receiver, the WASP will be able to take action because this command packet will contain the current packet count and will therefore let the WASP know whether or not it missed vital information.

If the transfer that erred (had a missing packet or a corrupted command packet) was a Failure Acknowledge and the new transfer is a Failure Acknowledge, the WASP will not see a discrepancy in the packet count because neither the erring transfer nor the new one causes the frame count to increment. The WASP can respond to the new transfer as if no error ever occurred.

If the first transfer after an erred Failure Acknowledge is not another Failure Acknowledge, then the receiving WASP will not see any error because the packet count will match the expected value. The WASP that sent the Failure Acknowledge will eventually retransmit it because it will not receive the expected retransmission before its timer expires.

If the transfer that erred was a Sanity Check, the WASP will also not see any discrepancy in the packet count of the new transfer. Like Failure Acknowledge, Sanity Checks do not cause the packet count to be incremented. Because Sanity Checks do not carry vital information, they may be safely ignored. Any transfer following a failed Sanity Check may be processed normally.

If the transfer that erred was any other type of transfer, the next command packet will include a packet count that does not match the expected value. The WASP may then submit a Failure Acknowledge to request retransmission. At this point, it will ignore further transfers until retransmission begins.

Note: Failure Acknowledge packets are never ignored. This will prevent a deadlock where each WASP is ignoring the other's Failure Acknowledges.

Command Code Errors

The GLink chips can detect if they receive an invalid control code with each frame. This control code is what tells the GLink receiver that the packet is a command or data packet. When the GLink chip receives an invalid control code, it will assert its ERROR signal. The WASP will ignore that particular packet (treating it like a fill frame). When the next packet comes, it may either be a command packet or a data packet. In either case, this situation becomes treated the same as the Packet Monitoring above.

Synchronization Loss

If the WASP detects that the GLink chips have lost synchronization, it will wait until sync is reestablished. When the next packet arrives, the WASP will be able to tell if it missed any information by comparing the packet counter value to the received packet count. If the values do not match, the WASP will issue a Failure ACK.

If synchronization loss persists, the WASP will enter a shutdown mode. As soon as the WASP detects that the serial link is not working, it begins a 2 second timer. While that timer is counting, the PCI slave state machine will reject all cycles with a retry. If the timer expires and the serial link is still not operating, the WASP will only respond to Type 0 configuration cycles. In other words, it will allow its registers to be read and written, but will not respond to any other cycles, causing those cycles to end with a master abort.

Running CRC

Although the likelihood of an erroneous packet being accepted as valid is very small, the WASP implements a second level of detection to improve coverage. Both the transmitting and receiving WASP maintain running CRCs based on information sent or received. Periodically, the transmitting WASP will send a Sanity Check transfer. This transfer contains the CRC calculated by the transmitter. The receiving WASP compares this value with its own CRC. If the values do not match, an error condition has occurred and the system must be halted (by asserting SERR_n).

Note that if an error is detected via any of the correctable methods listed above, that virtually guarantees an error would be detected by the running CRC; however, because the detection of errors causes the WASP to stop accepting packets (except for Failure Acknowledge transfers), the Sanity Check packet would also be ignored. Sanity Check packets are only accepted and analyzed when the system seems to be operating normally; therefore, an error detected by an invalid sanity CRC automatically indicates that an undetected error occurred. Asserting SERR_n then halts the system.

When a Failure Acknowledge is transmitted, the WASP sending the Failure Acknowledge resets its transmit CRC. The WASP receiving the Failure Acknowledge resets its receive CRC. This ensures that when retransmission occurs, the two copies of the CRC will track.

In addition, because Sanity Checks and Failure Acknowledges are ignored when an error occurs within them, they do not cause the running CRC to change when they are submitted.

Packet Generation

FIG. 10 is a block diagram of one embodiment of a portion of a primary bridge. Other embodiments are possible and contemplated. It is noted that the present invention may be implemented in either primary bridge 132 or secondary bridge 142 as shown in FIG. 2a. The following describes the present invention with respect to primary bridge 132. In the embodiment of FIG. 10, primary bridge 132 includes a queue 200, transmitter pipeline 202, and a parallel to serial transmitter 204. Primary bridge 132 is coupled to first PCI bus 130 and serial bus 104 as shown with more detail in FIG. 2a Queue 200 is coupled to first PCI bus 130 and to transmitter pipeline 202. Transmitter pipeline 202 is coupled to queue 200 and parallel to serial transmitter 204. Parallel to serial transmitter 204 is coupled to transmitter pipeline 202 and serial bus 104. In one embodiment, queue 200 is a first-in-first-out (FIFO) queue.

Transmitter pipeline 202 may be implemented as digital logic, discrete logic, a CPU, a DSP, a microcontroller, reconfigurable logic, e.g. a FPGA, an analog circuit, or a combination thereof, among others. In one embodiment, queue 200 and transmitter pipeline 202 are included in an application specific integrated circuit (ASIC).

Transmitter 204 may be implemented as digital logic, discrete logic, a CPU, a DSP, a microcontroller, reconfigurable logic, e.g. a FPGA, an analog circuit, or a combination thereof, among others. In one embodiment, transmitter 204 includes a GLink chip First PCI bus 130 is configured to transmit PCI bus cycles and primary bridge 132 is configured to receive PCI bus cycles. PCI bus cycles include an address phase and one or more data phases. During an address phase, a PCI address value and a PCI command value are provided on first PCI bus 130. During a data phase, a PCI data value and corresponding set of byte enable values are provided on first PCI bus 130. Primary bridge 132, in a manner similar to other PCI devices, determines whether to accept a particular PCI bus cycle through a decode and a comparison of the PCI address value and the PCI command value. If primary bridge 132 determines that it should accept a particular PCI bus cycle, it enters the PCI address value and the PCI command value into queue 200. It then enters the PCI data value and the corresponding set of byte enable values for each data phase into queue 200.

In one embodiment, primary bridge 132 stores each phase of a PCI bus cycle in a separate line of queue 200. According to this embodiment, queue 200 will store the address phase, including the PCI address value and the PCI command value, in a first line. Queue 200 will then store the one or more data phases, including the PCI data phase and the set of byte enable values for each data phase, in a second line and in subsequent lines as needed. Thus, after receiving and storing a PCI bus cycle, queue 200 will have a first line that contains a PCI address value and a PCI command value and at least one additional line that contains a PCI data value and a set of byte enable values.

One of the tasks of primary bridge 132 is to receive PCI bus cycles from first PCI bus 130 and transmit these cycles in a serial format on serial bus 104. In order to transmit PCI bus cycles in a serial format, primary bridge 132 is configured to convert the PCI bus cycle into a series of packets. Transmitter pipeline 202 provides the series of packets to parallel to serial transmitter 204 for transmission on serial bus 104. Secondary bridge 142, as shown in FIG. 2a, receives the series of packets and converts the packets back into a PCI bus cycle. Secondary bridge 142 can then transmit the recreated PCI bus cycle to the one or more peripheral devices 144 over second PCI bus 140, as shown in FIG. 2a

It is desirable for primary bridge 132 to process a PCI bus cycle and generate a corresponding series of packets in as efficient a manner as possible. The time required for primary bridge 132 to generate a series of packets presents an undesirable latency in the operation of primary bridge 132. Accordingly, one object of the present invention involves reducing the latency inherent in converting a PCI bus cycle to a series of packets for transmission on a serial bus.

Primary bridge 132 begins generating a series of packets for a PCI bus cycle when a PCI address value and a PCI command value reach the head of queue 200. In one embodiment, the series of packets generated by primary bridge 132 includes a command packet and one or more data packets. A command packet in this embodiment includes a serial command, a PCI command value, and a set of predicted byte enable values that corresponds to a PCI data value in a subsequent data phase. As discussed in more detail below, the predicted byte enable values allow more efficient parallel to serial conversion according to the present invention. Each of the data packets in this embodiment includes either the PCI address value from the address phase or the PCI data value of a subsequent data phase. Other embodiments could generate a similar series of packets.

In one embodiment, primary bridge 132 generates a command packet by concatenating a serial command, a PCI command value, a set of byte enable bits corresponding to a PCI data value, and other bits required by the serial protocol. Primary bridge 132 generates this command packet when the PCI address value and the PCI command value reach the head of queue 200. When the command packet is generated, the information regarding the data phases, particularly the sets of byte enable values, has not reached the head of the queue. Consequently, primary bridge 132 does not know what the actual values of the first set of byte enable values is when it generates the command packet. Primary bridge 132, thus, sets the set of byte enable values in the command packet to a set of predicted values to expedite the serial transfer of the PCI bus cycle. In one embodiment, primary bridge 132 sets the set of predicted values to a set of predetermined values. In one specific embodiment, primary bridge 132 sets the set of predicted values in each command packet to indicate a 32-bit PCI data transfer. It would be a design choice to set the set of predicted values to a different PCI data transfer width, e.g. 8-bit, 16-bit, or 64-bit, or to set the set of predicted values based on stored information corresponding to previous PCI data transfer widths.

When the set of actual byte enables corresponding to a PCI data value reaches the head of queue 200, primary bridge 132 compares the set of actual byte enables to the set of predicted byte enables that was assigned in the command packet. If the set of actual byte enables is the same as the set of predicted byte enables, primary bridge 132 continues by generating data packets for the PCI address value and the PCI data value or values. Primary bridge 132 can then transfer the command packet and the data packets over serial bus 104.

If the set of actual byte enables differs from the set of predicted byte enables, primary bridge 132 is configured to generate a second command packet that includes the set of actual byte enable values. After generating the second command packet, primary bridge 132 can generate data packets for the PCI address value and the PCI data value or values. Primary bridge 132 can then transfer the second command packet and the data packets over serial bus 104. If primary bridge 132 encounters a second data phase corresponding to a PCI bus cycle, it compares the set of byte enable values associated with this second data phase to the set of byte enable values assigned in the previous command packet. If the set of byte enable values associated with this second data phase differs from the set of byte enable values, primary bridge 132 is configured to generate a third command packet. Subsequent data phases are handled in a similar fashion.

Primary bridge 132 is configured to discard a command packet when it discovers that it contains an incorrect set of byte enable values. In one embodiment, transmitter pipeline 202 includes a three stage pipeline where it generates parity words and other packet maintenance information. Transmitter pipeline 202 is configured to store a command packet and a plurality of data packets. In this embodiment, primary bridge 132 can discard a command packet if it determines that it is not followed by at least two data packets. Consequently, if transmitter pipeline 202 detects a first command packet and then detects a second command packet immediately following the first command packet, primary bridge 132 can discard the first command packet. The same mode of operation can be repeated with subsequent data phases. Once transmitter pipeline 202 recognizes that it contains a command packet followed by at least two data packets, it can then transfer the packets to parallel to serial transmitter 204 for transmission on serial bus 104.

In one embodiment, transmitter pipeline 202 is configured to store a command value and an address value after they are clocked out of queue 200. If transmitter pipeline 202 determines that the set of actual byte enable values differs from the set of predicted byte enable values, it uses the stored command value to generate a second command packet. Transmitter pipeline 202 also regenerates the first data packet, i.e. the data packet containing the address value, using the stored address value.

In one embodiment, as noted above with reference to FIG. 6 and FIG. 7, a packet includes 40 bits that include two 20-bit frames, although the size of the packet and/or frames is largely a design choice. Each of the two 20-bit frames include 16 bits of information about the transaction and 4 bits of parity. In one embodiment, parallel to serial transmitter 204 includes a 20-bit parallel interface that is configured to receive one 20-bit frame at a time.

The following examples illustrate the operation of one embodiment of primary bridge 132. The numbers in the examples are represented in a hexadecimal format unless followed by a lowercase 'b' to indicate a binary format.

In example 1, a PCI write operation with two data phases appears on first PCI bus 130 with the following parameters:

Address Phase
  PCI Command Value=0111b (memory write)
  PCI Address Value=ABCD0000
First Data Phase
  PCI Byte Enable Values=0000b (32 bit transfer)
  PCI Data Value=12345678
Second Data Phase
  PCI Byte Enable Values=0000b (32 bit transfer)
  PCI Data Value=DEADBEEF Primary bridge 132 decodes the PCI command value and PCI address value and determines to accept the PCI bus cycle. Primary bridge 132 then enters the address phase and the data phases into queue 200. Queue 200 thus has the following entries:

0111b ABCD0000
  0000b 12345678
  0000b DEADBEEF

Primary bridge 132 detects that queue 200 is no longer empty. Primary bridge 132 then uses the information at the head of the queue to generate a command packet. This command packet includes a set of byte enables that are set to a set of predetermined values. For purposes of this example, the set of predetermined values indicates a 32 bit transfer.

While generating the command packet, the PCI address value is clocked out of queue 200 leaving the first data phase at the head of the queue. Primary bridge 132 compares the set of byte enable values associated with the first PCI data value with the set of predetermined values. In this example, the set of byte enable values associated with the first PCI data value matches the set of predetermined values. Consequently, primary bridge 132 does not need to create another command packet. A similar comparison is performed when the second data phase reaches the head of queue 200. In this example, the set of byte enable values associated with the second PCI data value matches the set of predetermined values and primary bridge 132 does not need to create another command packet.

In example 2, a PCI write operation with two data phases appears on first PCI bus 130 with the following parameters:

Address Phase
  PCI Command Value=0111b (memory write)
  PCI Address Value=ABCD0000
First Data Phase
  PCI Byte Enable Values=0011b (16 bit transfer)
  PCI Data Value=12345678
Second Data Phase
  PCI Byte Enable Values=1011b (8 bit transfer)
  PCI Data Value=DEADBEEF As in example 1, primary bridge 132 decodes the PCI command value and PCI address value and determines to accept the PCI bus cycle. Primary bridge 132 then enters the address phase and the data phases into queue 200. Queue 200 thus has the following entries:

0111b ABCD0000
  0011b 12345678
  1011b DEADBEEF

Primary bridge 132 detects that queue 200 is no longer empty. Primary bridge 132 then uses the information at the head of the queue to generate a command packet. This command packet includes a set of byte enables that are set to a set of predetermined values. Again, the set of predetermined values indicates a 32 bit transfer.

While generating the command packet, the PCI address value is clocked out of queue 200 leaving the first data phase at the head of the queue. Primary bridge 132 compares the set of byte enable values associated with the first PCI data value with the set of predetermined values. In this example, the set of byte enable values associated with the first PCI data value differs from the set of predetermined values. Consequently, primary bridge 132 is configured to generate a second command packet and discard the first command packet. A similar comparison is performed when the second data phase reaches the head of queue 200. In this example, the set of byte enable values associated with the second PCI data value again differs from the set of byte enable values associated with the first PCI data value. Thus, primary bridge 132 is configured to generate a third command packet for the second data phase.

Although the previous discussion of FIG. 10 has focused on the operation of primary bridge 132, secondary bridge 142.can be configured in a similar manner. In one embodiment not shown, secondary bridge 142 includes a queue 200, a transmitter pipeline 202, and parallel to serial transmitter 204. The operation of secondary bridge 142 would then be similar to that described above for primary bridge 132.

Figure 11A:
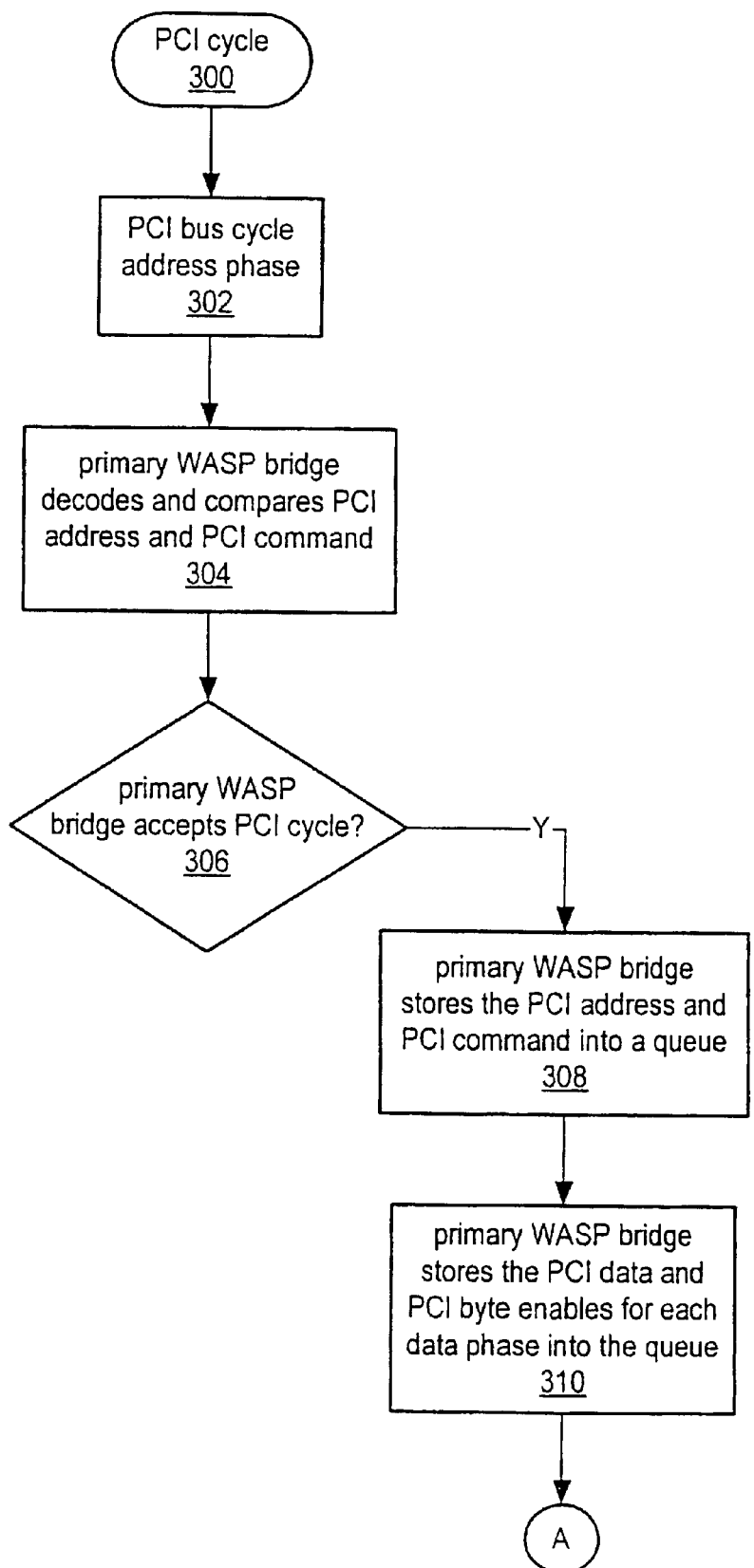
FIGS. 11a–c: are a flowchart illustrating a method for efficiently generating packets on a serial bus in response to receiving a parallel bus cycle in a bus bridge.
Figure 11B:
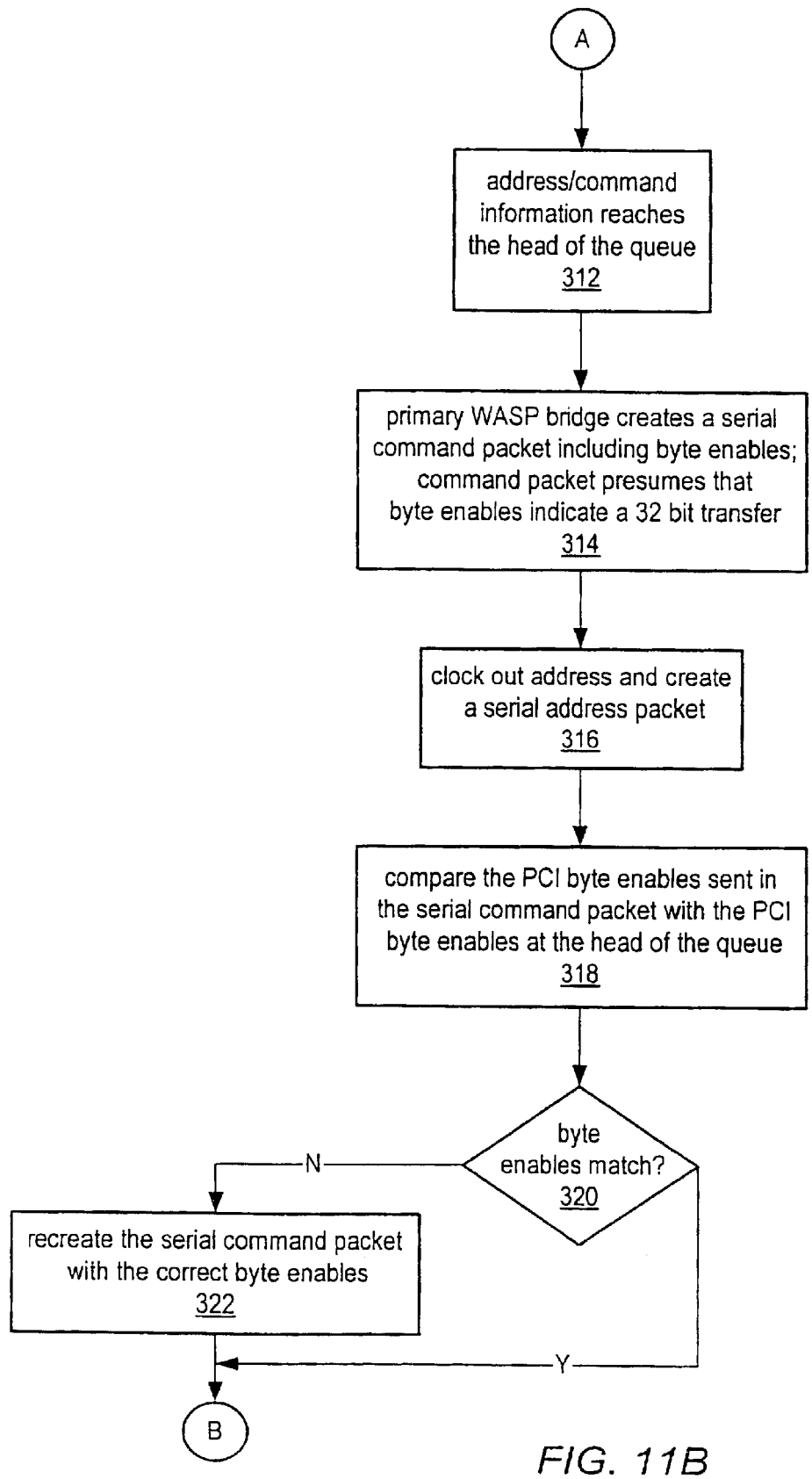
Figure 11C:
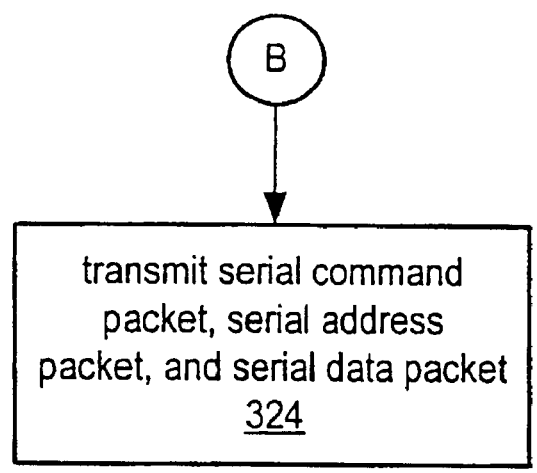

FIGS. 11a–c are a flowchart illustrating a method for efficiently generating packets on a serial bus in response to receiving a parallel bus cycle in a bus bridge. Other embodiments are possible and contemplated. FIGS. 11a–c are intended to illustrate a single continuous flowchart. The connection between FIG. 11a and FIG. 11b is represented by a circled A in each figure and the connection between FIG. 11b and FIG. 11c is represented by a circled B in each figure.

FIGS. 11a–c illustrate a method for efficiently generating packets on a serial bus in response to receiving a parallel bus cycle in a bus bridge according to one embodiment. Block 300 indicates the generation of a PCI bus cycle. A PCI bus cycle can be generated in a host computer system or in a peripheral device as shown in FIG. 2a Block 302 represents an address phase of a PCI bus cycle being transmitted over a PCI bus. Block 304 indicates a primary WASP bridge decoding and comparing a PCI address and PCI command. In block 306, the primary WASP bridge then determines whether to accept the PCI bus cycle. If the primary WASP bridge accepts the PCI bus cycle, the chart continues at block 308 where the primary WASP bridge stores the PCI address and the PCI command into a queue. In block 310, the primary WASP bridge stores the PCI data and PCI byte enables in the queue for each data phase. When the PCI address and PCI command information reach the head of the queue as shown in block 312, the primary WASP bridge creates a serial command packet as indicated in block 314. The serial command packet includes byte enables that are set to indicate a 32 bit transfer. Block 316 illustrates clocking out the PCI address and creating a serial address packet. In block 318, the primary WASP bridge compares the PCI byte enables sent in the serial command packet with the PCI byte enables at the head of the queue. The primary WASP bridge then determines whether the byte enables match as shown in block 320. If the byte enables do not match, the primary WASP bridge recreates the serial command packet with the correct byte enables as shown in block 322. If the byte enables do match, the primary WASP bridge continues by transmitting the serial command packet, serial address packet, and serial data packet to the secondary WASP bridge over a serial bus.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system for connecting peripheral devices to a computer, comprising:
   a host computer system, wherein said host computer system includes a CPU and memory;
   a first parallel bus coupled to the host computer system;
   a primary bridge coupled to the first parallel bus, wherein said primary bridge includes parallel interface circuitry for interfacing to the first parallel bus;
   a second parallel bus located remotely from said host computer system;
   one or more peripheral devices coupled to the second parallel bus; and
   a secondary bridge coupled to said second parallel bus, wherein said secondary bridge is located remotely from said host computer system, wherein said secondary bridge includes parallel interface circuitry for interfacing to said second parallel bus; and
   a serial bus coupled between said primary bridge and said secondary bridge, wherein the serial bus includes a first end and a second end, wherein said first end of said serial bus is coupled to said primary bridge and said second end of said serial bus is coupled to said secondary bridge;
   wherein said primary bridge and said secondary bridge are configured to transmit a parallel bus cycle over said serial bus, wherein said parallel bus cycle includes an address phase and a data phase, wherein said address phase includes a command value and an address value, and wherein said data phase includes a first set of byte enable values and a data value;
   wherein said primary bridge is configured to receive said parallel bus cycle, wherein said primary bridge is configured to generate a first command packet that corresponds to said address phase, wherein said primary bridge is configured to generate a plurality of data packets that each correspond to said parallel bus cycle, wherein said first command packet includes a second set of byte enable values, and wherein said primary bridge is configured to set said second set of byte enable values to a set of predetermined values prior to generating said plurality of data packets, wherein said predetermined values comprise predicted values of the first set of byte enable values.

2. The system of claim 1, wherein said primary bridge is configured to compare said first set of byte enable values to said set of predetermined values, and wherein said primary bridge is configured to generate a second command packet if said first set of byte enable values differs from said set of predetermined values.

3. The system of claim 2, wherein said primary bridge is configured to store said first set of byte enable values in said second command packet if said first set of byte enable values differs from said set of predetermined values.

4. The system of claim 2, wherein said primary bridge is configured to discard said first command packet if said first set of byte enable values differs from said set of predetermined values.

5. The system of claim 1, wherein said primary bridge is configured to set said second set of byte enable values irrespective of said first set of byte enable values.

6. The system of claim 1, wherein said primary bridge further includes a FIFO queue, wherein said FIFO queue includes a head and a tail, wherein said primary bridge is configured to store said command value and said address value in said FIFO queue upon receipt of said address phase, and wherein said primary bridge is configured to generate said first command packet when said command value reaches said head of said FIFO queue.

7. The system of claim 6, wherein said primary bridge is configured to store said first set of byte enable values and said data value in said FIFO queue upon receipt of said data phase, wherein said primary bridge is configured to compare said first set of byte enable values to said set of predetermined values when said first set of byte enable values reaches said head of said FIFO queue, and wherein said primary bridge is configured to generate a second command packet if said first set of byte enable values differs from said set of predetermined values.

8. The system of claim 7, wherein said second command packet includes a third set of byte enable values, and wherein said primary bridge is configured to set said third set of byte enable values equal to said first set of byte enable values if said first set of byte enable values differs from said set of predetermined values.

9. The system of claim 1, wherein a first of said plurality of data packets corresponds to said address value, wherein a second of said plurality of data packets corresponds to said data value, and wherein said primary bridge is configured to transmit said first command packet and said plurality of data packets to said secondary bridge over said serial bus.

10. The system of claim 1, wherein said first parallel bus comprises a Peripheral Component Interconnect (PCI) bus, and wherein said second parallel bus comprises a Peripheral Component Interconnect (PCI) bus.

11. A method for transmitting a parallel bus cycle over a serial bus in a computer system, the method comprising:
    generating said parallel bus cycle in a host computer, wherein said parallel bus cycle includes an address phase and a data phase, wherein said address phase includes a command value and an address value, and wherein said data phase includes a first set of byte enable values and a data value;
    transmitting said parallel bus cycle from said host computer to a primary bridge over a first parallel bus;
    generating a first command packet in said primary bridge, wherein said first command packet includes a predicted set of byte enable values, and wherein said first command packet corresponds to said address phase of said parallel bus cycle; and
    generating a plurality of data packets in said primary bridge, wherein each of said plurality of data packets corresponds to said parallel bus cycle.

12. The method of claim 11, further comprising:
    comparing said first set of byte enable values to said set of predicted values in said primary bridge; and
    generating a second command packet in said primary bridge if said first set of byte enable values differs from said set of predicted values, wherein said second command packet includes said first set of byte enable values.

13. The method of claim 12, further comprising:
    discarding said first command packet in said primary bridge if said first set of byte enable values differs from said set of predicted values.

14. The method of claim 11, further comprising:
    transmitting information from said primary bridge to a secondary bridge over a serial bus;
    recreating said parallel bus cycle in said secondary bridge in response to receiving said information from said primary bridge;

transmitting said parallel bus cycle from said secondary bridge to a peripheral device over a second parallel bus;

comparing said first set of byte enable values to said set of predicted values in said primary bridge; and generating a second command packet in said primary bridge if said first set of byte enable values differs from said set of predicted values.

15. The method of claim 14, wherein said second command packet includes a third set of byte enable values, wherein said generating said second command packet includes setting said third set of byte enable values equal to said first set of byte enable values if said first set of byte enable values differs from said set of predicted values, and wherein said transmitting said information includes transmitting said second command packet and said plurality of data packets if said first set of byte enable values differs from said set of predicted values.

16. The method of claim 11, further comprising:

storing said command value and said address value in a FIFO queue in said primary bridge upon receipt of said address phase; and performing said generating said first command packet when said address phase reaches a head of said FIFO queue.

17. The method of claim 16, further comprising:

storing said first set of byte enable values and said data value in said FIFO queue in said primary bridge upon receipt of said data phase;

comparing said first set of byte enable values to said set of predetermined values when said first set of byte enable values reaches said head of said FIFO queue; and generating a second command packet in said primary bridge if said first set of byte enable values differs from said set of predetermined values.

18. The method of claimed 17, wherein said second command packet includes a third set of byte enable values, wherein said generating said second command packet includes setting said third set of byte enable values equal to said first set of byte enable values if said first set of byte enable values differs from said set of predetermined values, and wherein said transmitting said information includes transmitting said second command packet and said plurality of data packets if said first set of byte enable values differs from said predicted set of byte enable values.

19. The method of claim 11, wherein a first of said plurality of data packets corresponds to said address value, wherein a second of said plurality of data packets corresponds to said data value, and wherein said transmitting said information includes transmitting said first command packet and said plurality of data packets.

20. The method of claim 11, wherein said firs parallel bus cycle comprises a Peripheral Component Interconnect (PCI) bus cycle.

21. A bus bridge configured to transmit a parallel bus cycle over a serial bus in a computer system, wherein said bus bridge is configured to receive said parallel bus cycle, wherein said parallel bus cycle includes an address phase and a data phase, wherein said address phase includes a command value and an address value, and wherein said data phase includes a first set of byte enable values and a data value, comprising:

a queue configured to store said address phase and said data phase;

a transmitter pipeline coupled to said queue, wherein said transmitter pipeline is configured to generate a first command packet in response to an address phase reaching a head of said queue, wherein said first command packet includes a second set of byte enable values, and wherein said transmitter pipeline is configured to set said second set of byte enable values to a set of predetermined values prior to said data phase reaching said head of said queue; and a transmitter coupled to said transmitter pipeline, wherein said transmitter is configured to transmit a plurality of packets over said serial bus in a serial format.

22. The bus bridge of claim 21, wherein said transmitter pipeline is configured to compare said first set of byte enable values to said set of predetermined values when said data phase reaches said head of said queue, and wherein said transmitter pipeline is configured to generate a second command packet if said first set of byte enable values differs from said set of predetermined values.

23. The bus bridge of claim 22, wherein said transmitter pipeline is configured to store said first set of byte enable values in said second command packet if said first set of byte enable values differs from said set of predetermined values.

24. The bus bridge of claim 23, wherein said transmitter pipeline is configured to generate a first data packet corresponding to said address value stored in said queue, wherein said transmitter pipeline is configured to generate a second data packet corresponding to said data value stored in said queue, and wherein said transmitter is configured to transmit said second command packet, said first data packet, and said second data packet if said first set of byte enable values differs from said set of predetermined values.

25. The bus bridge of claim 24, wherein said transmitter is configured to transmit said first command packet, said first data packet, and said second data packet if said first set of byte enable values does not differ from said set of predetermined values.

26. The bus bridge of claim 22, wherein said transmitter pipeline is configured to discard said first command packet if said first set of byte enable values differs from said set of predetermined values.

27. The bus bridge of claim 21, wherein said transmitter pipeline is configured to set said second set of byte enable values irrespective of said first set of byte enable values.

28. The bus bridge of claim 21, wherein said queue includes a FIFO queue.

29. The bus bridge of claim 21, wherein said transmitter pipeline is configured to generate a first data packet corresponding to said address value stored in said queue, wherein said transmitter pipeline is configured to generate a second data packet corresponding to said data value stored in said queue, and wherein said transmitter is configured to transmit said first command packet, said first data packet, and said second data packet.

30. The bus bridge of claim 21, wherein said bus bridge comprises a PCI bus bridge.

31. A method for transmitting a parallel bus cycle over a serial bus in a system, the method comprising:

generating said parallel bus cycle in a host computer, wherein said parallel bus cycle includes an address phase and a data phase, wherein said address phase includes a command value and an address value, and wherein said data phase includes a first set of byte enable values and a data value;

transmitting said parallel bus cycle from said host computer to a first interface over a first parallel bus;

generating a first packet in said first interface, wherein said first packet includes a predicted set of byte enable values, wherein the first packet is generated prior to availability of the first set of byte enable values;

receiving the first set of byte enable values after said generating the first packet;

comparing the first set of byte enable values to the set of predicted values; and generating a second packet in the first interface if the first set of byte enable values differs from the set of values, wherein said second packet includes said first set of byte enable values.

32. The method of claim 31,
wherein the first packet is discarded if said first set of byte enable values differs from said set of predicted values.

* * * * *

UNITED STATES PATENT AND TRADEMARK OFFICE
CERTIFICATE OF CORRECTION

PATENT NO. : 6,950,440 B1 Page 1 of 1
DATED : September 27, 2005
INVENTOR(S) : Conway It is certified that error appears in the above-identified patent and that said Letters Patent is hereby corrected as shown below:

Column 21,
Line 52, delete "said firs parallel" substitute -- said parallel --.

Signed and Sealed this

Twentieth Day of December, 2005

JON W. DUDAS
*Director of the United States Patent and Trademark Office*